Patented Aug. 14, 1945

2,382,914

UNITED STATES PATENT OFFICE 2,382,914

NEW COLORING MATTERS

Maurice Arthur Thorold Rogers, Blackley, Manchester, England, assignor to Imperial Chemical Industries Limited, a corporation of Great Britain No Drawing. Application September 3, 1942, Serial No. 457,228. In Great Britain December 17, 1941

13 Claims. (Cl. 260—240)

The present invention relates to the manufacture of new coloring matters.

These new coloring matters are members of a new class of colored organic compounds, the simplest member of which has the formula $C_{32}H_{23}N_3$.

I have found that this colored compound $C_{32}H_{23}N_3$ has the constitutional formula here shown:

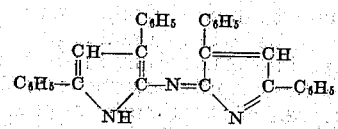

I have named this compound 2:2':4:4'-tetraphenyl-aza-dipyrromethine and the class 2:2':4:4'-tetraaryl-5:5'-aza-dipyrromethines.

The new class of compounds has the constitutional formula:

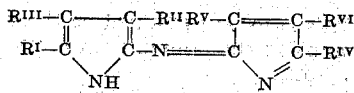

where $R^I$, $R^{II}$, $R^{IV}$ and $R^V$ each stand for an aryl radical, for example a radical of the benzene or naphthalene series, substituted or not, the same or different, and where $R^{III}$ and $R^{VI}$ each stand for hydrogen or for a non-reactive substituent, the same or different, for example an aryl-, alkyl-, alkylamino-, benzylideneamino-, or acylamino-radical.

According to the invention the new 2:2':4:4'-tetraaryl-aza-dipyrromethines are manufactured by processes hereinafter more particularly described.

According to one method of carrying out the invention one molecular proportion of a 5-nitroso-2:4-diarylpyrrole is caused to interact with one molecular proportion of a 2:4-diarylpyrrole. The interaction may be brought about, for example, by heating the reactants together advantageously dissolved in a mutual solvent, and preferably in the presence of an acidic condensing agent, for example, acetic acid or acetic anhydride.

Alternatively a 5-nitroso-2:4-diarylpyrrole or its hydrochloride is heated to about 190° C. If a free 5-nitroso-2:4-diarylpyrrole be used, it is preferable to carry out the heating in presence of a small proportion of an acid.

Again, a 5-amino-2:4-diarylpyrrole is submitted to the action of an oxidising agent, even a mild oxidising agent, e. g. atmospheric oxygen.

2:4-diarylpyrroles useful for these embodiments of the invention are compounds of the formula

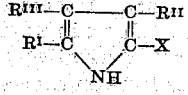

where $R^I$ and $R^{II}$ each stand for an aryl radical for example of the benzene or naphthalene series, substituted or not, the same or different, e. g., phenyl, p-methoxyphenyl, p-dimethylamino-phenyl, m-nitrophenyl, o-chlorophenyl, m-hydroxyphenyl, p-acetylaminophenyl and naphthyl, where $R^{III}$ stands for hydrogen or for a non-reactive substituent which may be, like $R^I$ and $R^{II}$, an aryl radical, but also may be an alkyl- or alkylamino- or benzylideneamino- or acylamino-radical, and where, as required, X stands for hydrogen or for a nitroso- or an amino-radical.

Suitable 2:4-diarylpyrroles include 2:4-diphenylpyrrole, 2-phenyl-4-(p-methoxyphenyl)-pyrrole, 2(p-methoxyphenyl)-4-phenylpyrrole, 2-(m-hydroxyphenyl)-4-phenylpyrrole, 2-(o-chlorophenyl)-4-phenylpyrrole, 2-(p-acetylaminophenyl)-4-phenylpyrrole, 2-α-naphthyl-4-phenylpyrrole, 2-phenyl-4-β-naphthylpyrrole, 2:3:4-triphenylpyrrole, 3-benzoylamino-2:4-diphenylpyrrole, 3-acetylamino-2:4-diphenylpyrrole, 3-benzoylamino-2:4-di-p-tolylpyrrole and 3-acetoacetylamino-2:4-diphenylpyrrole. Also included are the sulphonic acids of the 2:4-diarylpyrroles or salts of these, which may be made, for example, by sulphonating the above compounds. 5-nitroso or 5-amino derivatives of these 2:4-diarylpyrroles are also included. Mixtures of these compounds may be used.

By way of explanation the formation of the new compounds of this invention is represented in equation form as follows, it being noted that the 2:4-diarylpyrroles may, by tautomeric interchange, have either the formula A or B.

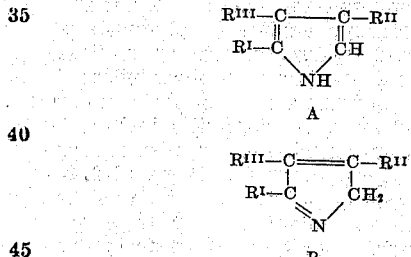

where $R^I$, $R^{II}$ and $R^{III}$ have the significance given above.

Thus the production of 2:2':4:4'-tetraphenyl-aza-dipyrromethine, $C_{32}H_{23}N_3$, as an illustrative example, is shown in the following equations:

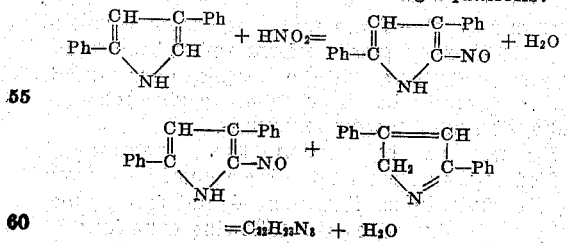

As yet a further alternative, the new colored compounds are made by a process which comprises heating 1-nitromethyl- or 1-cyano-1:3-diaryl-3-propanones (which may contain a non-reactive substituent in position 2) or simple functional derivatives of these ketones, e. g. their oximes, with ammonia or with an ammonia-yielding reagent, an oxidizing agent being present when necessary, that is when the 1-cyano-propanones are being used.

In carrying into effect these features of the invention the 1-nitromethyl- or the 1-cyano-1:3-diaryl-3-propanone is heated with the ammonia or the ammonia-yielding reagent to a temperature of 120 to 200° C., that is to a temperature such that the ingredients are molten. Alternatively, the ingredients may be heated together in a mutual solvent, for example, methanol. As an oxidizing agent, when this is necessary a current of air may conveniently be used. When the ammonia-yielding reagent is such that water is liberated under the reaction conditions, for example when using ammonium formate as the ammonia-yielding reagent, the heating is preferably carried out under such conditions that the water is removed from the reacting mass.

The aryl radicals of the above mentioned propanones include those of the benzene or naphthalene series, substituted or not, the same or different, e. g., phenyl, p-methoxyphenyl, p-dimethylaminophenyl, m-nitrophenyl, o-chlorophenyl, m-hydroxyphenyl, p-acetylaminophenyl or naphthyl; the non-reactive substituent in position 2 may be an aryl, alkyl-, alkylamino-, benzylideneamino- or acylamino-radical. The compounds can be described as generators of 2:4-diarylpyrroles, in so far as they are capable of forming the 2:4-diarylpyrroles used in the hereinbefore described features of the invention, by reactions involving ring formation. The 1-nitromethyl-1:3-diaryl-3-propanones may also be described as 1-nitro-2:4-diaryl-4-butanones and the 1-cyano-1:3-diaryl-3-propanones may also be described as 1-aryl-2-aroyl-propionitriles. Suitable 1-nitro-2:4-diaryl-4-butanones include 1-nitro-2:4-diphenyl-butanone-4, 1-nitro-2:4-di-(p-methoxyphenyl)-butanone-4, 1-nitro-2-(p-methoxyphenyl)-4-phenyl-butanone-4, 1-nitro-2-phenyl-4-(p-methoxyphenyl)-butanone-4, 1-nitro-2-(m-nitrophenyl)-4-phenyl - butanone-4, 1-nitro-2-(m-hydroxyphenyl) - 4 - phenyl-butanone-4, 1-nitro-2-(p-dimethylaminophenyl)-4-phenyl-butanone-4, 1-nitro-2-(3:4-methylenedioxyphenyl)-4-phenylbutanone-4, or their oximes. Suitable 1-aryl-2-aroyl-propionitriles include 1-phenyl-2-benzoyl-propionitrile, 1-(p-methoxyphenyl)-2-benzoylpropionitrile, 1-phenyl-2-(p-methoxybenzoyl)-propionitrile, 1-(m-hydroxyphenyl) - 2 - benzoylpropionitrile, 1-(o-chlorophenyl)-2-benzoylpropionitrile, 1-(p-acetylaminophenyl)-2-benzoylpropionitrile, 1-α-naphthyl-2-benzoylpropionitrile, 1-phenyl-2-β-naphthoyl-propionitrile, 1-(p-dimethylaminophenyl)-2-benzoylpropionitrile, or their oximes.

Suitable ammonia-yielding reagents include formamide, urea, thiourea, ammonium formate, ammonium phosphate and ammonium carbamate. Of these ammonium formate has been found to give good results with both types of compound, and formamide has been found to give good results with the 1-nitro-compounds.

By way of explanation, the formation of 2:2':4:4'-tetraphenyl-aza-dipyrromethine from 1-nitro-2:4-diphenylbutanone-4 and formamide, may be illustrated by the following equation:

$$2Ph-CH(CH_2.NO_2)-CH_2-CO-Ph + H-CO-NH_2 = C_{32}H_{23}N_3 + CO_2 + 5H_2O$$

When a 1-phenyl-2-benzoyl-propionitrile is used, as illustrated by the following equation, the formation of 2:2':4:4'-tetraphenyl-aza-dipyrromethine involves oxidation:

$$2Ph-CH(CN)-CH_2-CO-Ph + H-CO-NH_2 + O = C_{32}H_{23}N_3 + H-CO-OH + H_2O$$

The above processes starting with either a nitro-diaryl-butanone or a cyano-diaryl propanone are interrelated and are further closely related to the process which starts with an amino-diaryl-pyrrole, as will be apparent from the following considerations.

To begin with, taking formamide for instance, this one has a tendency to decompose into carbon monoxide and ammonia. Therefore, in the case of a nitro-diaryl-butanone, the reaction may be looked upon as proceeding in stages whereby the reducing effect of the CO and simultaneous elimination of water first convert the nitro-butanone to a cyano-propanone. Again, by the action of ammonia on the latter, an amino-pyrrole may be expected as intermediate product. Thus, starting with either the nitro-butanone or the cyano-propanone type of initial material produces a reaction mass which is equivalent in effect to starting with an amino-pyrrole.

As shown above, the last-mentioned reaction generally requires the presence of a mild oxidizing agent. In the nitro-butanone process, the reaction will ofen proceed without an oxidizing agent. This is to be explained by the very probable assumption that the oxygen is furnished by the nitro group.

The new 2:2':4:4'-tetraryl - aza - dipyrromethines are solids of high melting point. Some will sublime unchanged. Their color is blue, of shade varying according as the phenyl radicals are substituted or not, and according to the nature of the substituents, if any. The differences in shade between these compounds are more pronounced when the compounds are viewed in the crystalline form by reflected light, than when they are viewed in solution by transmitted light. They are sparingly soluble in most organic solvents. They do not readily react with most simple reagents, unless reactive groups, e. g., salt forming groups, are present, for instance, as substituents in the phenyl radicals.

The new compounds may be used as pigments and for other coloring purposes, and it is a feature of the invention to use products when prepared as hereinbefore described or by the obvious chemical equivalents of these processes for coloring purposes, especially in relation to textiles, and in the production of coating compositions. In the form of their water-soluble derivatives, for example, salts, or sulphonic acids or salts of these, the new coloring matters are especially useful for dyeing textiles. The water-soluble derivatives may be obtained by forming salts of those of the coloring matters which are sufficiently basic, for example with sulphamic acid, by forming quaternary ammonium salts (when quaternary salt-forming groups are present), for example with methyl iodide, or by sulphonation of the coloring matters to yield sulphonic acid derivatives which are in themselves, or in the form of their salts, soluble in water. Alternatively, the sulphonic acid derivatives may be obtained by using the initial reagent, or one or more reagents where more than one initial reagent is used, in the form of a sulphonic acid derivative or a salt thereof. The synthesis of these is described more fully and claimed in my copending application Serial No. 482,479, which is to be issued on the same date herewith.

The invention is illustrated but not limited by the following examples, in which the parts are by weight.

EXAMPLE 1

150 parts of 1-nitro-2:4-diphenyl-butanone-4 are mixed with 450 parts of formamide. The mixture is stirred and heated. At 120° C. it begins to turn blue and after about ¼ hour at 190° C. blue crystals, needles, are visible.

The mixture is cooled, 750 parts of methyl alcohol are added, and the suspension is filtered. The blue crystalline solid is washed with methyl alcohol and dried. It is 2:2':4:4'-tetraphenyl-aza-dipyrromethine.

This substance is sparingly soluble in most organic solvents, but can be crystallised from those of high boiling point. Thus from hot 2-ethoxy-ethyl alcohol ("Cellosolve" — registered trade-mark), or from hot benzene or from dioxan, it forms clustered needles, dark blue in color with a metallic-coppery-reflex.

It dissolves in cold concentrated sulphuric acid to give a deep blue solution, which on immediate dilution with water gives a blue precipitate.

When heated in a sublimation apparatus under subatmospheric pressure it sublimes.

EXAMPLE 2

52 parts of 1-nitro-2:4-di(p-methoxyphenyl)-butanone-4 (made by condensing p:p'-di-methoxychalkone with nitromethane) are heated with 160 parts of ammonium formate to 180° C. The molten mass is not homogeneous, and part turns blue in color. When the blue oil first formed solidifies to a crystalline paste and no further coloring matter appears to be being formed, the reaction mass is cooled, and mixed with 250 parts of ethyl alcohol, the crystalline blue material being almost insoluble in alcohol. It is then filtered off, washed with ethyl alcohol and dried. There is thus obtained 2:2':4:4'-tetra-(p-methoxyphenyl)-aza-dipyrromethine, which may be further purified by recrystallisation, from pyridine.

The following table lists in the third column the aza-dipyrromethines which are made by the process of the above example, that is by heating the 1-nitromethyl or 1-cyano-1:3-diaryl-3-propanones or their oximes set out in the first column with ammonium formate. The fifth column gives the color of the product as viewed by reflected light, when crystallised from the solvent indicated in column 4.

Table

| Starting material | Method of making starting material | Product of reaction | Cryst. from | Reflex color of crystals |
|---|---|---|---|---|
| 1-nitro-2-(p-methoxyphenyl)-4-phenyl-butanone-4. M. P. 66° C. | Addition of nitromethane to p-methoxybenzal-acetophenone. | 2:2'-diphenyl-4:4'-di-(p-methoxyphenyl)-aza-dipyrromethine. | Nitro-benzene. | Dark copper. |
| 1-nitro-2-phenyl-4-(p-methoxyphenyl)-butanone-4. M. P. 92-3° C. | Addition of nitromethane to benzal-p-methoxyacetophenone. | 2:2'-di(p-methoxy-phenyl)-4:4'-diphenyl-aza-dipyrromethine. | Ethoxy-ethyl alcohol. | Dark blue. |
| 1-nitro-2-(m-nitrophenyl)-4-phenyl-butanone-4. M. P. 74-7° C. | Addition of nitromethane to m-nitro-benzalacetophenone. | 2:2'-diphenyl-4:4'-di(m-nitrophenyl)-aza-dipyrromethine. | Nitrobenzene. | Bright green. |
| 1-nitro-2-(m-hydroxyphenyl)-4-phenylbutanone-4. oil. | Addition of nitromethane to m-hydroxy-benzalacetonephenone. | 2:2'-diphenyl-4:4'-di(m-hydroxyphenyl)-aza-dipyrromethine. | Ethoxyethyl alcohol. | Violet. |
| 1-nitro-2-(p-dimethylaminophenyl)-4-phenylbutanone-4. M. P. 114-5° C. | Addition of nitromethane to p-dimethyl-aminobenzal-acetophenone. | 2:2'-di-phenyl-4:4'-di(p-dimethylaminophenyl)-aza-dipyrromethine. | ----do---- | Copper. |
| 1-nitro-2-(3:4-methylenedioxyphenyl)-4-phenylbutanone-4. | Addition of nitromethane to (3:4-methylene-dioxybenzal)-acetophenone. | 2:2'-di-phenyl-4:4'-di(3:4-methylenedioxyphenyl)-aza-dipyrromethine. | ----do---- | Dark copper. |
| 1-nitro-2:4-di-(p-methoxyphenyl)-butanone-4. oil. | Addition of nitromethane to p-methoxybenzal-p-methoxy-acetophenone. | 2:2':4:4'-tetra-(p-methoxyphenyl)-aza-dipyrromethine. | Pyridine. | Copper. |
| 1-phenyl-2-benzoylpropionitrile. | Addition of HCN to benzal-acetophenone. | 2:2':4:4'-tetraphenyl-aza-dipyrromethines. | ----do---- | Do. |
| 1-p-methoxyphenyl-2-benzoyl-propionitrile. | Robertson and Stephens, J. Chem. Soc. 1931, 863. | 2:2'-diphenyl-4:4'-di(p-methoxyphenyl)-aza-dipyrromethine. | ----do---- | Do. |
| 1-phenyl-2-(p-methoxybenzoyl)-propionitrile. | Kohler, J. Amer. Chem. Soc. 1934, 56, 981. | 2:2'-di-(p-methoxyphenyl)-4:4'-diphenyl-aza-dipyrromethine. | ----do---- | Do. |
| 1-nitro-2:4-diphenyl-butanone-4-oxime. M. P. 110°. | Action of hydroxylamine on 1-nitro-2:4-diphenyl-butanone-4. | 2:2':4:4'-tetraphenylaza-dipyrromethine. | ----do---- | Do. |
| 1-phenyl-2-benzoyl-propionitrile oxime. M. P. 140-1°. | Action of hydroxylamine on 1-phenyl-2-benzoyl-propionitrile. | 2:2':4:4'-tetraphenyl-aza-di-pyrromethines. | ----do---- | Do. |
| 1-nitro-2-(p-dimethyl-aminophenyl)-4-phenyl-butanone-4-oxime. M. P. 123°. | Action of hydroxylamine on 1-nitro-2-(p-dimethylamino-phenyl)-4-phenyl-butanone-4. | 2:2'-diphenyl-4:4'-di-(p-dimethylamino-phenyl)-aza-dipyrromethine. | ----do---- | Do. |

EXAMPLE 3

28 parts of 5-nitroso-2:4-diphenylpyrrole hydrochloride (made by treatment of 2:4-diphenyl-pyrrole with sodium nitrite and hydrochloric acid; see, for instance, Example 1 of my copending application Ser. No. 457,230), and 22 parts of 2:4-diphenylpyrrole are dissolved in 100 parts of glacial acetic acid. The yellow solution is heated to boiling in a vessel provided with a reflux condenser. It rapidly becomes deep blue in color and crystals of a blue compound separate. When the reaction is complete as judged by there being no indication of continued formation of blue compound the mixture is filtered. The blue compound is washed and dried.

This product is identical with that of Example 1.

Instead of 22 parts of 2:4-diphenylpyrrole there may be used 25 parts of 2-phenyl-4-p-methoxy-phenylpyrrole and there is thus obtained 2:2':4-triphenyl-4'-p-methoxyphenyl-aza-dipyrromethine.

EXAMPLE 4

4 parts of 5-nitroso-2:4-diphenylpyrrole hydrochloride and 5 parts of 3-benzoylamino-2:4-diphenylpyrrole are dissolved in 250 parts of acetic anhydride. The solution is heated to boiling for about ½ hour in a vessel provided with a reflux condenser. It rapidly turns deep blue. The blue solution is poured into 500 parts of cold water, and the aqueous mixture is stirred until the acetic anhydride has become converted into acetic acid. It is then filtered. The blue solid obtained is washed with water and dried.

The new compound is 2:2':4:4'-tetraphenyl-3-benzoylamino-aza-dipyrromethine.

EXAMPLE 5

5-amino-2:4-diphenylpyrrole is dissolved in ethyl alcohol and the solution is heated to the boil. A stream of air is then passed through the solution and there is formed a blue precipitate. This is collected by filtration and consists of 2:2':4:4'-tetraphenyl-aza-dipyrromethine.

The 5-amino-2:4-diphenylpyrrole used in this example is obtained by reduction of 5-nitroso-2:4-diphenylpyrrole with hydrogen in methyl alcohol solution in the presence of a platinum oxide catalyst. The 5-amino-2:4-diphenylpyrrole so obtained is soluble in hot benzene, from which it separates on cooling in the form of colorless needles, M. P. 155–156° C.

EXAMPLE 6

1 part of 1-α-naphthyl-2-benzoylpropionitrile (M. P. 84° C., prepared by addition of hydrogen cyanide to the chalkone formed by condensation of α-naphthaldehyde with acetophenone) is heated to 180° C. with 5 parts ammonium formate in the presence of air. The molten mass is not homogeneous and the oil becomes blue in color and finally solidifies. The reaction mass is cooled, mixed with 10 parts of methyl alcohol and the sparingly soluble blue material, 2:2'-diphenyl - 4:4' - di - α - naphthyl - aza - dipyrromethine, is filtered off and dried.

EXAMPLE 7

1-phenyl-2-β-naphthoylpropionitrile (M. P. 124° C., made by addition of hydrogencyanide to the chalkone, M. P. 106° C., obtained by condensing benzaldehyde with β-acetonaphthone) is treated with ammonium formate under the conditions described in Example 6 and there is thus obtained 4:4'-diphenyl-2:2'-di-β-naphthyl-aza-dipyrromethine.

EXAMPLE 8

1-α-naphthyl-2-β-naphthoylpropionitrile, (M. P. 142° C. made by addition of hydrogencyanide to the chalkone, M. P. 161° C., obtained by condensing α-naphthaldehyde with β-acetonaphthone) is treated with ammonium formate under the conditions described in Example 6 and there is thus obtained 2:2'-di-β-naphthyl-4:4'-di-α-naphthyl-aza-dipyrromethine.

EXAMPLE 9

27 parts of 2-phenyl-4-α-naphthylpyrrole and 28 parts of 5-nitroso-diphenylpyrrole are dissolved together in a mixture of 100 parts of glacial acetic acid and 10 parts of acetic anhydride and the solution is heated to boiling under a reflux condenser. The solution soon becomes a deep reddish-blue in color and later blue crystals separate. When no further blue crystals separate the mixture is cooled and filtered and the insoluble 2:2':4-triphenyl-4'-α-naphthyl-aza-dipyrrolmethine is washed and dried.

The 2-phenyl-4-α-naphthylpyrrole used in this example is obtained by dehydrogenating, by means of selenium (see, for instance, Example 1 of my copending application Ser. No. 457,229), the pyrroline obtained by hydrogenation of 1-α-naphthyl-2-benzoylpropionitrile.

EXAMPLE 10

125 parts of 5-nitroso-2:4-diphenylpyrrole and 110 parts of 2:4-diphenylpyrrole are heated to 100° C. with 250 parts of acetic acid and 50 parts of acetic anhydride for 30 minutes. The blue crystals which form are separated by filtration, washed and dried. 215 parts are obtained. The product is identical with that of Example 1.

EXAMPLE 11

1 part of 1-nitro-2:4-diphenyl-butanone-4 is heated with 5 parts of aqueous ammonia (Sp. Gr. 0.88) in a closed vessel at 180° C. for 12 hours. The vessel is cooled, opened, and the liquid, containing the excess of aqueous ammonia, is decanted from the tarry deposit which has formed. The tarry deposit is mixed with ethyl alcohol, and the 2:2':4:4'-tetraphenyl-aza-dipyrromethine, now in the form of a blue finely crystalline mass, is collected by filtration, washed and dried.

EXAMPLE 12

16 parts of finely powdered sodium 2:4-diphenylpyrrole mono-sulphonate (made by sulphonating the pyrrole under conditions such that a mono-sulphonic acid is formed, and then converting the product to the sodium salt; see for instance Example 1 of my copending application Serial No. 482,479), 14 parts of 5-nitroso-2:4-diphenylpyrrole hydrochloride, 100 parts of acetic acid and 10 parts of acetic anhydride are heated together to boiling for 2 hours. After cooling, the blue solid, which has separated, is removed by filtration, washed and dried. It is 2:2':4:4'-tetraphenyl-aza-dipyrromethine mono-sulphonic acid. 20 parts are obtained. The new product is slightly soluble in water or in dilute aqueous sodium hydroxide, and is more soluble in dilute aqueous pyridine.

EXAMPLE 13

3.8 parts of 2:4-diphenylpyrrole disulphonic acid (made by sulphonating the pyrrole under conditions such that a disulphonic acid is formed; see for instance Example 2 of my copending application Serial No. 482,479), 2.4 parts of 5-nitroso-2:4-diphenylpyrrole, 100 parts of acetic acid and 20 parts of acetic anhydride are heated to the boil for about 1 minute, cooled and the so-formed black tar is washed with acetic acid. It is 2:2':4:4'-tetraphenyl-aza-dipyrromethine disulphonic acid, and is soluble in water forming strongly blue colored solutions, which dye wool in blue shades from an acid dye-bath.

In place of the 5-nitroso-2:4-diphenylpyrrole there may be used 5-nitroso-2-(p-methoxyphenyl)-4-phenylpyrrole.

EXAMPLE 14

3 parts of finely powdered 5-nitroso-2:4-diphenylpyrrole monosulphonic acid) made by nitrosating 2:4-diphenylpyrrole monosulphonic acid; see for instance Example 2 of my copending application Serial No. 457,230), 3 parts of finely powdered sodium 2:4-diphenylpyrrole monosulphonate, 400 parts of acetic acid and 100 parts of acetic anhydride are heated together to boiling for 2 hours. After cooling, the blue precipitate, which has formed, is removed by filtration, washed and dried. It is 2:2':4:4'-tetraphenyl-aza-dipyrromethine disulphonic acid, and is isomeric with the product of Example 13, differing in that it is less soluble in water or dilute alkalies.

EXAMPLE 15

The following example gives another method of converting a tetraaryl-aza-dipyrromethine into a water-soluble derivative:

2:2' - diphenyl - 4:4' - di(p - dimethylaminophenyl)-aza-dipyrromethine, made according to the method of Example 2 is mixed with 2 molecular proportions of methyl iodide dissolved in nitrobenzene. After 24 hours, the 2:2'-diphenyl-4:4'-di(p-dimethylaminophenyl)-aza-dipyrromethine dimethiodide, which separates as a blue solid, is removed by filtration, washed and dried. It dissolves in water forming clear, deep blue solutions, which dye wool blue from a neutral dyebath.

I claim:

1. 2:2':4:4' - tetraaryl - 5:5' - aza-dipyrromethines, in which the aryl radicals possess no more than 10 cyclic carbon atoms each.

2. A compound of the group consisting of the members represented by the formula hereinbelow and the salts and addition compounds of such members, said formula being

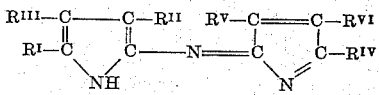

wherein $R^I$, $R^{II}$, $R^{IV}$ and $R^V$ stand each for an aryl radical having not more than 10 carbon atoms in its nuclear structure, and wherein $R^{III}$ and $R^{VI}$ stand for members of the group consisting of hydrogen, alkyl, alkylamino, benzylideneamino, acylamino and aryl of not more than 10 cyclic carbon atoms.

3. Water-soluble quaternary ammonium salts of the compounds having the formula set forth in claim 2.

4. The water-soluble reaction product of sulfamic acid upon a compound of the formula as defined in claim 2.

5. A compound as defined in claim 2, wherein at least one of the aryl radicals represented by $R^I$, $R^{II}$, $R^{IV}$ and $R^V$ carries a sulfo group.

6. A compound as defined in claim 2, wherein the aryl radicals represented by $R^I$, $R^{II}$, $R^{IV}$ and $R^V$ are benzenoid radicals at least one of which carries a sulfo group.

7. A compound of the series consisting of the free base form of 2:2':4:4'-tetraaryl-5:5'-aza-dipyrromethines, quaternary salts of the same, the sulfamic acid addition compounds of the same, sulfonic acid derivatives of the same and salts of the latter, and in which the aryl radicals specified possess no more than 10 cyclic carbon atoms each.

8. A compound selected from the group consisting of the free base form and quaternary ammonium derivatives of a compound of the formula

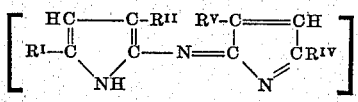

wherein $R^I$, $R^{II}$, $R^{IV}$ and $R^V$ each stands for a benzenoid aryl radical.

9. Process for the manufacture of coloring compounds which comprises heating a member of the group consisting of 2:4-diaryl-5-aminopyrrols and initial materials adapted to yield 2:4-diaryl-5-amino-pyrrols in situ, in the presence of an oxidizing agent, to effect condensation between two molecules of said compound with formation of a 2:2':4:4'-tetraaryl-5:5'-aza-dipyrromethine as expressed by the formula Q—N=Q', wherein Q and Q' are respectively monovalent and divalent radicals of 2:4-diarylpyrrols attached to the N-atom above shown in their respective 5-position.

10. A process as in claim 9, the initial material being a mixture of a 1-cyano-1:3-diaryl-3-propanone and an ammonia yielding agent.

11. A process as in claim 9, the initial material being a mixture of a 1-nitro-2:4-diaryl-4-butanone and an ammonia yielding agent.

12. Process for the manufacture of coloring compounds which comprises reacting a 2:4-diaryl-5-nitroso-pyrrole with a 2:4-diaryl-pyrrole having a free 5-position, in the presence of acid, to yield a 2:4:2':4'-tetraaryl-5:5'-aza-dipyrromethine.

13. Process for the manufacture of coloring compounds which comprises heating a 2:4-diaryl-5-nitroso-pyrrole in the presence of acid to yield a 2:4:2':4'-tetraaryl-5:5'-aza-dipyrromethine.

MAURICE ARTHUR THOROLD ROGERS.

CERTIFICATE OF CORRECTION.

Patent No. 2,382,914. August 14, 1945.

MAURICE ARTHUR THOROLD ROGERS.

It is hereby certified that error appears in the printed specification of the above numbered patent requiring correction as follows: Page 3, in the table, third column thereof, seventh compound, for "2:2:4':4'-tetra-" read -- 2:2':4:4'-tetra- --; page 4, first column, line 64, Example 9, for "pyrrolmethine" read --pyrromethine--; and that the said Letters Patent should be read with this correction therein that the same may conform to the record of the case in the Patent Office.

Signed and sealed this 13th day of November, A. D. 1945.

Leslie Frazer (Seal)                  First Assistant Commissioner of Patents.